1210856B2

United States Patent
Yerli

(10) Patent No.: US 11,210,856 B2
(45) Date of Patent: Dec. 28, 2021

(54) SYSTEM AND METHOD FOR INTERACTION-LEVEL BASED TELEMETRY AND TRACKING WITHIN DIGITAL REALITIES

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 6 days.

(21) Appl. No.: 16/545,914

(22) Filed: Aug. 20, 2019

(65) Prior Publication Data
US 2021/0056757 A1    Feb. 25, 2021

(51) Int. Cl.
*G06T 19/00*    (2011.01)
*H04W 4/021*    (2018.01)

(52) U.S. Cl.
CPC .......... *G06T 19/006* (2013.01); *G06T 19/003* (2013.01); *H04W 4/021* (2013.01)

(58) Field of Classification Search
CPC combination set(s) only.
See application file for complete search history.

(56) References Cited

U.S. PATENT DOCUMENTS

| | | |
|---|---|---|
| 2011/0153727 A1 | 6/2011 | Li |
| 2012/0215625 A1 | 8/2012 | Ramer et al. |
| 2013/0073388 A1 | 3/2013 | Heath |
| 2013/0117377 A1 | 5/2013 | Miller |
| 2013/0226758 A1 | 8/2013 | Reitan |
| 2014/0172570 A1 | 6/2014 | y Arcas et al. |
| 2014/0267598 A1 | 9/2014 | Drouin et al. |
| 2016/0093108 A1 | 3/2016 | Mao et al. |
| 2016/0321841 A1* | 11/2016 | Christen .............. G06F 3/167 |
| 2017/0006356 A1 | 1/2017 | Krasadakis |
| 2017/0013247 A1* | 1/2017 | Kim .................... H04N 13/194 |

(Continued)

FOREIGN PATENT DOCUMENTS

WO    2019/036773 A1    2/2019

OTHER PUBLICATIONS

Extended European Search Report dated Oct. 13, 2020, issued in corresponding European Application No. EP 20191245, 10 pages.

*Primary Examiner* — Andrew G Yang
(74) *Attorney, Agent, or Firm* — Christensen O'Connor Johnson Kindness PLLC

(57) ABSTRACT

A system and method for facilitating tracking of interactions with a plurality of content types within a digital reality. One or more users enter a public digital zone where content from one or more holographic applications is available for interaction through digital reality devices. Interactions include seeing, looking at, clicking on, engaging with, and immersing into the digital content from the one or more holographic applications. Potential outputs of these interactions include transactions, switching to other holographic applications, or completely exiting the holographic application. Each of these interactions is continuously tracked by a telemetry and tracking cloud server communicatively connected to a cloud server and holographic application. Cloud servers of each public digital zone connect to cloud servers of other public digital zones, enabling users to seamlessly access holographic applications located in other public digital zones.

20 Claims, 6 Drawing Sheets

(56) References Cited

U.S. PATENT DOCUMENTS

| | | |
|---|---|---|
| 2017/0091450 A1* | 3/2017 | Turgeman ............... G06F 21/32 |
| 2017/0151484 A1 | 6/2017 | Reilly et al. |
| 2017/0287111 A1* | 10/2017 | Makinen .................. G06F 3/14 |
| 2018/0040161 A1* | 2/2018 | Tierney ................... G06F 3/015 |
| 2018/0093186 A1* | 4/2018 | Black ...................... G06T 11/60 |
| 2018/0211183 A1 | 7/2018 | Innes |
| 2019/0043447 A1 | 2/2019 | Chung et al. |
| 2019/0122443 A1* | 4/2019 | Stocker ................. H04L 67/141 |
| 2019/0128676 A1* | 5/2019 | Naik ....................... G06T 7/248 |
| 2019/0379948 A1* | 12/2019 | McClam ............... G06T 19/006 |
| 2020/0111119 A1* | 4/2020 | Singhal ............. G06Q 10/0833 |
| 2020/0219023 A1* | 7/2020 | Duchastel .......... G06Q 10/0635 |

* cited by examiner

SYSTEM AND METHOD FOR INTERACTION-LEVEL BASED TELEMETRY AND TRACKING WITHIN DIGITAL REALITIES

BACKGROUND

Online advertising has become one of the preferred ways for advertisers to promote their products in publisher's websites. Advertisers and publishers use a wide range of media buying models, including fixed payments, cost per mille (CPM), cost per click (CPC), cost per engagement (CPE), cost per view (CPV), cost per install (CPI), cost per acquisition (CPA), and pay per performance (PPP), amongst others. Typically, measuring of these interactions by a publisher stops once a user has left the publisher's website. Hence, interactions that take place outside of the publisher's website are in the most part unknown to the publishers, constraining the advertising payment strategies to include only the interactions that take place before the user leaves the publisher's website.

Technology developments for providing digital content to users in recent years have enabled users to interact with the content in ways that were not possible in the past. Particularly, augmented reality (AR), virtual reality (VR), and mixed reality (MR) change a user's perception on what they are seeing, hearing, and feeling, and how much of the real world comes into these experiences, providing the user with a sensation of a physical presence in places in the real world or an imagined world. These new digital content provisioning technologies differ greatly from the traditional methods, especially because with the new technologies all interactions take place in a three-dimensional world rather than in the "flat world", or 2D world, of traditional methods. Advertisers can place digital content on these three-dimensional worlds and drive user interaction with the content.

New forms of interactions are enabled with these more advanced types of digital content, which have the potential to be tracked, measured, and analyzed. Therefore, what is needed is a system and method enabling continuous telemetry and tracking of interactions within digital realities for ultimately supporting novel digital media monetization strategies.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems, and more specifically to systems and methods for interaction-level based telemetry and tracking within digital realities.

Drawbacks described in the background are addressed by the current disclosure through a system and method for continuous (or substantially continuous, allowing for occasional network latency problems or service interruptions) telemetry and tracking of interactions between users and digital content. In described embodiments, the telemetry and tracking are performed on each interaction, tracking and obtaining telemetry data from the lowest levels of interaction (e.g., seeing or looking) to the highest levels of interaction (e.g., immersing). This data can then be used for further analysis. The continuous telemetry and tracking of interactions is enabled by a system architecture that integrates publishers' and advertisers' digital platforms. The system and method expand the tracking of more complex levels of interaction than current technologies. Additionally, the system and method support digital transactions that may be derived from the continuous tracking of most possible interactions between users and digital content.

According to an embodiment, an interaction telemetry and tracking system includes a server computer system comprising one or more server computers, the server computer system being programmed to delimitate a public digital zone where users may obtain digital content from one or more holographic applications; provide the one or more holographic applications via digital reality devices; continuously track and obtain interaction data and telemetry metadata of a digital reality device; detect the digital reality device accessing the public digital zone and initiate tracking of user interactions with digital content of the one or more holographic applications; retrieve and render the digital content and send the digital content to the digital reality device; and receive user input via the digital reality device and send the input data to the one or more holographic applications in order to update the applications.

The server computer system may include at least a first cloud server and a second cloud server. In an embodiment, the first cloud server is programmed to perform the steps of delimitating the public digital zone, detecting the digital reality device accessing the public digital zone, signaling the second cloud server to initiate tracking of the user interactions, retrieving and rendering the digital content, sending the digital content to the digital reality device, receiving the user input via the digital reality device, and sending the input data to the one or more holographic applications, and the second cloud server is programmed to perform the steps of tracking and obtaining interaction data and telemetry metadata of the digital reality device.

In an embodiment, when a user enters a public digital zone, the first cloud server prompts the second cloud server to start the continuous tracking and obtention of telemetry metadata of each of the interactions between the user and the digital content retrieved from the one or more holographic applications. When one or more users physically or virtually move to another public digital zone, then the user may view and interact with digital content located in that other public digital zone. For this purpose, the first cloud server is also connected to cloud servers of other public digital zones. If a user decides to switch to another holographic application from another public digital zone, then the second cloud server will also track user interactions with digital content from other holographic applications located in that other public digital zone and instruct the corresponding cloud servers to provide and render the digital content of the holographic applications to the users via the digital reality devices.

According to an embodiment, depending on the current user interaction and user preferences, public digital zones may be accessed as public augmented reality (AR) zones or public virtual reality (VR) zones. Users may switch between the same types of public digital zones or between different types of zones. Thus, the server computer system may be further programmed to enable the users' digital reality devices to switch between public digital zones, including switching from AR zones to other AR zones, AR zones to VR zones, VR zones to AR zones, and VR zones to other VR zones. Hence, one or more parts of the digital content to be provided to the at least one user in the public digital zone may include AR or VR digital content. If a user views the digital content as AR digital content, the AR digital content includes physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of the user or virtual objects overlay in the real world to become interactive and digitally manipulable. If a user views the digital content as VR digital content, the VR digital content may include virtual elements that are used to replace the real world with a simulated one.

According to an embodiment, the first cloud server may be a remote server including computing resources sufficient to carry out heavy load applications such as rendering digital content from one or more sources, such as one or more holographic applications. Additionally, the first cloud server may be configured to provide a combined single data stream to at least one digital reality device.

In some embodiments, the digital reality devices may be, for example, mobile devices, personal computers, game consoles, smart contact lenses, media centers, and head-mounted displays, amongst others.

In some embodiments, the digital content provided by the one or more holographic applications may include 3D image data, 3D geometries, 3D entities, 3D sensory data, 3D dynamic objects, video data, audio data, textual data, time data, positional data, orientational data, haptic data, and lighting data, amongst others, or combinations of such content.

According to an embodiment, a method enabling interaction telemetry and tracking comprises the steps of detecting, by a first cloud server, a digital reality device connected to a network and accessing a public digital zone associated with one or more holographic applications stored in the first cloud server; signaling, by the first cloud server, a second cloud server to initiate tracking of user interactions through the digital reality devices with digital content of a holographic application hosted at and provided by the first cloud server; retrieving and rendering, by the first cloud server, content from holographic application and sending the content to the digital reality device; and receiving, by the first cloud server, user input via the digital reality device, and sending the input to the holographic application in order to update the applications.

During interactions between users and digital content, the users may have the option to change to other holographic applications located in other public digital zones. If the user decides to keep interacting with the same holographic application or with other holographic applications within the same public digital zone, then the method may go back to the first cloud server retrieving and rendering content and sending the respective content to the digital reality device. However, if users decide to interact with digital content from another holographic application located in another public digital zone, then the second cloud server instructs the respective cloud sever to retrieve the digital content from the first cloud server in order to provide the content to the user via the digital reality device. Throughout all of the steps of the method after the user has entered a public digital zone or switched to another public digital zone, the second cloud server tracks the most possible amount of interactions that take place between users and the digital content. Said tracking may comprise geolocation tracking of digital reality devices and metadata tracking of user interactions.

According to an embodiment, the first cloud server enables the digital reality device to perform any of a plurality of possible levels of interaction and to receive potential outputs to users from the first cloud server. The possible levels of interaction include a user seeing digital content from the holographic application; looking at the digital content from a holographic application; clicking on the digital content from the holographic application; engaging with digital content from the holographic application; and immersing into digital content from the holographic application. Potential outputs from the interactions include completely exiting the holographic application; performing a transaction; or accessing another holographic application, either within our outside of the current public digital zone.

According to an embodiment, when selecting to transact or to access other holographic applications, the method continues by performing the steps of enabling returning to initial or other applications; during user interaction with the initial or other application, providing immersive experiences into digital content from original or other holographic application; and generating potential outputs related to the original or other holographic application. The transactions may comprise commercial or social transactions.

After performing a transaction, the user may keep interacting with the digital content from the holographic application and continue the process until exiting the holographic application. If a user accesses another holographic application, the user may go back to the initial holographic application, or may continue interacting with the other holographic application until deciding to exit.

According to an embodiment, the method further comprises storing and analyzing, by the second cloud server, all interactions from the interaction data and metadata obtained and tracked from the digital reality devices for supporting digital media buying models, market research, business quality management, and other purposes. In yet a further embodiment, interaction data and metadata are registered via the use of a smart contract governing and interfacing the path to the storage. In such an embodiment, the storage database is in the form of a blockchain or a distributed ledger-based database.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages of the present disclosure will be apparent from the accompanying drawings and from the detailed description that follows below.

BRIEF DESCRIPTION OF THE DRAWINGS

The disclosure may be best understood by referring to the following description and accompanying drawings that are used to illustrate embodiments of the disclosure by way of example and not limitation, without departing from the spirit and scope of the disclosure. In the drawings, like reference numerals indicate similar elements.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
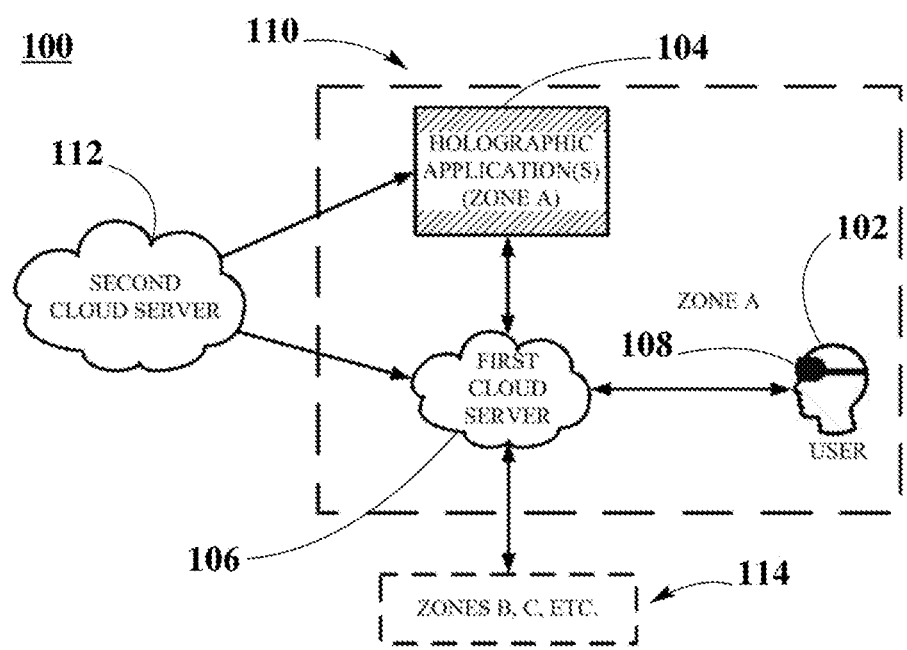
FIGS. 1A-C depict a continuous interaction telemetry and tracking system, according to an embodiment.
Figure 1B:
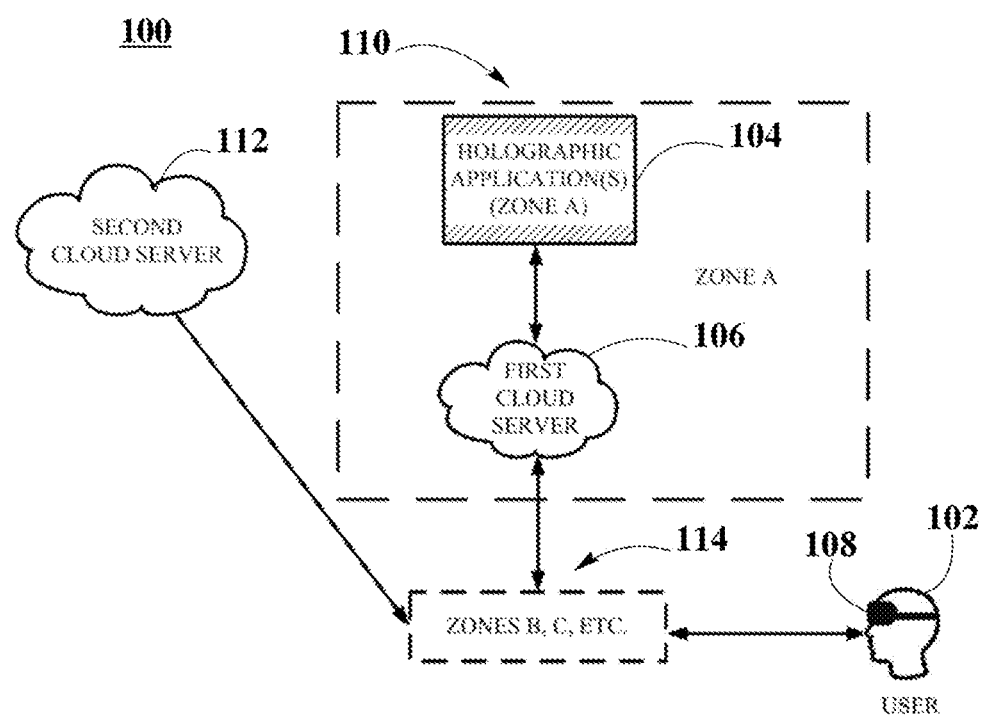
Figure 1C:
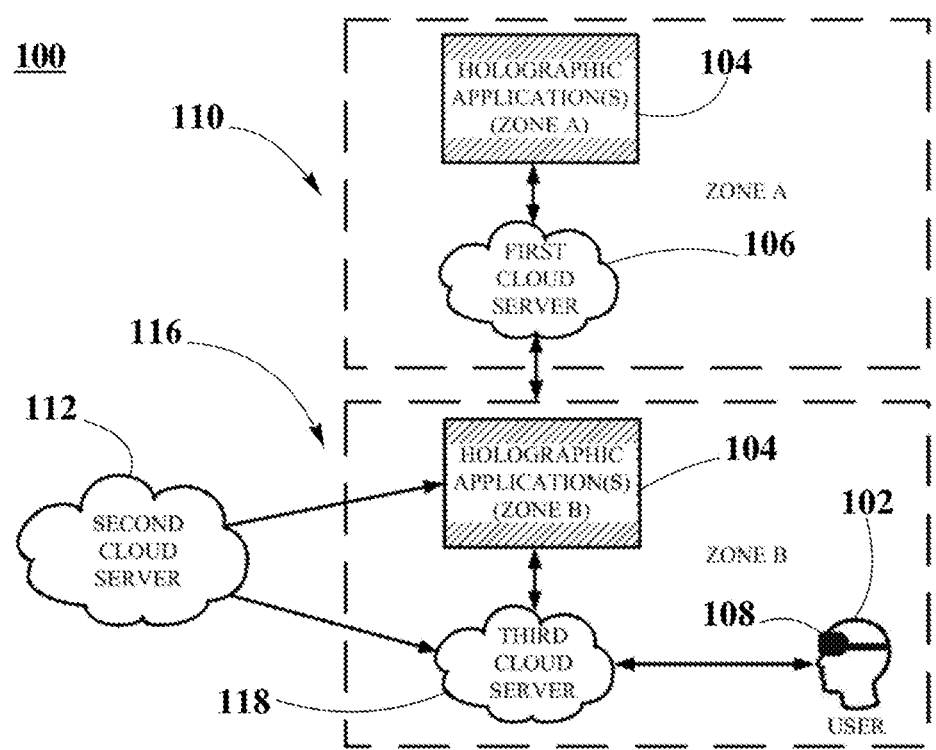

FIGS. 1A-C depict a system 100 enabling user interaction telemetry and tracking, according to an embodiment. The system 100 may be used to track and continuously (or substantially continuously, allowing for occasional network latency problems or service interruptions) obtain telemetry metadata of each of the interactions that a user 102 may experience with digital content retrieved from one or more sources, such as one or more holographic applications 104. The system includes a server computer system. As illustrated in these examples, the server computer system includes a first cloud server 106 and a second cloud server 112, but it will be understood that other configurations of the server computer system are possible, and that the functions described herein as being assigned to the first cloud server 106 and the second cloud server 112, respectively, may instead be distributed differently between the two servers, or may performed by a single server or by more than two servers in any suitable arrangement. However, these examples include particularly effective strategies for distributing the functions between the first cloud server 106 and the second cloud server 112 in the illustrated arrangement, as described in further detail below.

In the example shown in FIGS. 1A-C, digital content is rendered by a first cloud server 106 and viewed by a user 102 through a digital reality device 108 connected to a network. The digital reality devices 108 may be for example, mobile devices, personal computers, game consoles, media centers, and head-mounted displays, amongst others.

In some embodiments, holographic applications 104 may be available from one or more application libraries stored in the memory of the first cloud server 106, from external platforms, or through blockchains or distributed ledger-based distributed databases. The holographic applications 106 can be one or more traditional applications, distributed applications or decentralized applications. The interaction mechanics of each holographic application 104 are defined through the use of computer code included in computer scripts and computer programs, and may be enabled through the holographic applications 104, through smart contracts, or combinations thereof provisioned in the first cloud server 106. The holographic applications 104, smart contracts or combinations thereof thus enable digitally codifying and representing the possible and desired interactions and interaction interfaces between users and the holographic applications 104. Interactions may be experienced by users in the form of interactive game-like applications or through game-like interaction mechanics.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or "IaaS"), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

According to an embodiment, the digital content provided by the one or more holographic applications 104 may include 3D image data, 3D geometries, 3D entities, 3D sensory data, 3D dynamic objects, video data, audio data, textual data, time data, positional data, orientational data, haptic data, and lighting data, amongst others. One or more parts of the digital content to be provided to the at least one user 102 in the public digital zone may include augmented reality (AR) or virtual reality (VR) digital content. If a user 102 views the digital content as AR digital content, the AR digital content includes physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of the user 102 or virtual objects overlay in the real world to become interactive and digitally manipulable. If a user 102 views the digital content as VR digital content, the VR digital content may include virtual elements that are used to replace the real world with a simulated one and may also include elements from the real world.

According to an embodiment, the first cloud server 106 may be a remote server including computing resources sufficient to carry out heavy load applications such as rendering digital content from one or more sources, such as the one or more holographic applications 104. The first cloud server 106 may be configured to provide a combined single data stream to at least one digital reality device 108. The digital reality device 108 may communicatively connect to the first cloud server 106 through different wireless systems including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data preferably at 16 GHz. Provided communication systems may allow for low (e.g. about 1 to about 5 millisecond end-to-end (E2E)) latency and high (e.g., 1-10 Gbps) downlink speeds to end points in the field, complying with parameters necessary for executing the typically highly-interactive real-world projects. This results in high-quality, low latency, real-time digital application content streaming. In other embodiments, the system 100 may communicatively connect through 4th generation wireless systems communication (4G), may be supported by 4G communication systems, or may include other wired or wireless communication systems.

User interaction with digital content may be gesture-enabled, whereby the user 102 employs one or more gestures for interaction. For example, the gestures can be natural user interface (NUI) gestures. NUI may be defined as any interface technology that enables a user 102 to naturally interact with a device, free from artificial constraints imposed by input devices such as mices, keyboards, remote controls, and the like. Examples of NUI methods include those methods that employ gestures, such as tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example. NUI technologies include touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems comprising natural user interface, as well as technologies for sensing brain activity using electric field sensing electrodes (e.g., electro-encephalograph (EEG)) and other neuro-biofeedback methods.

According to an embodiment, each digital reality device 108 includes sensing mechanisms mounted thereon that include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. Preferably, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high quality of service (QOS) functionalities provided by mmW-based antennas may enable sub-centimeter or sub-millimeter positional and orientational tracking, which may increase accuracy when tracking the real-time position and orientation of the digital reality devices 108. In some embodiments, tracking by the second server may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device. Providing an accurate tracking of the digital reality devices 108 may result useful for displaying a reliable position and orientation of users, which may be relevant in order to show the digital content in a view that fits the user's viewing position and orientation.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 16 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

As seen in FIG. 1A, one or more users 102 may initially be located in a public digital zone, such as public digital zone A 110. Each public digital zone may be delimitated by the area serviced by the respective cloud server around one or more holographic applications 104, where all users may have access to the holographic applications 104 configured within the public digital zone. In the public digital zone A 110, one or more users 102 are able to view and interact, through the digital reality device 108, with digital content retrieved by first cloud server 106 from the one or more holographic applications 104. The digital content may be available to all users 102 present at the public digital zone, such as public digital zone A 110. As soon one or more user 102 enters public digital zone A 110, a second cloud server 112 starts to continuously track and obtain telemetry metadata of each of the interactions between the one or more user 102 and the digital content from the one or more holographic applications 104, which is done by monitoring the one or more holographic applications 104 and the respective first cloud server 106 for that public digital zone A 110.

In some embodiments, the first cloud server 106 delimitates a public digital zone by configuring geographical coordinates to predetermined values around the one or more holographic applications, such that the holographic application may be accessed through the digital reality devices only once the digital reality devices are located within the predetermined geographical coordinates. Said delimitation may be configured during the development stage of the corresponding holographic applications 104. In yet a further embodiment, the public digital zone may vary based on achievements from users in holographic applications and thus may change for one or more specific users 102. For example, a public digital zone comprising a treasure hunt application may be activated for all users 102 starting on a first level of said application, but once one or more users 102 find a treasure within the public digital zone, the public digital zone may move to another geographic location only for those specific one or more users 102.

The one or more users 102 may view all available digital content from the one or more holographic applications 104 located in the public digital zone A 110. However, when the one or more users 102 physically (i.e., in AR) or virtually (i.e., in VR) move to another public digital zone 114, then the one or more users 102 may view and interact with digital content located in that other public digital zone 114. For this purpose, the first cloud server 106 is also connected to cloud servers of other public digital zones 114. Thus, as appreciated in FIG. 1B, if a user 102 decides to switch to another application located in another public digital zone 114, then the second cloud server 112 tracks user interactions with digital content from other holographic applications 104 located in the other public digital zone 114. This tracking between different public digital zones by the second cloud server 112 enables a majority of possible interactions between users 102 and content to be tracked regardless of the public digital zone A 110 where the one or more holographic applications 104 are located.

As appreciated in FIG. 1C, once a user 102 has selected content from another public digital zone 114, such as of public digital zone B 116, then the user 102 may connect through the digital reality device 108 to a third cloud server 118 located at public digital zone B 116 and may start viewing and interacting with the respective digital content therein available. Simultaneously, the second cloud server 112 tracks telemetry metadata of each interaction by monitoring the one or more holographic applications 104 and the respective third cloud server 118.

According to an embodiment, depending on the current user interaction and user preferences, public digital zones may be accessed as public AR zones or public VR zones. When users 102 switch between one zone and another, the users 102 may perform the switching by going from AR to AR, AR to VR, VR to AR, and VR to VR public digital zones.

According to an embodiment, the first and/or second cloud servers store in memory a data structure representing the at least one portion of the world included within the public digital zone into a plurality of virtual objects forming a persistent virtual world system, wherein at least some of the virtual objects are virtual replicas corresponding to the real world elements and to respective holographic applications. In some embodiments, the virtual objects further comprise purely virtual objects. Depending on whether a user accesses the public digital zone in augmented or virtual reality, the first and/or second servers may activate one or more virtual objects from the persistent virtual world system in the view of a user. For example, if a viewer accesses the public digital zone in virtual reality, the first and/or second server may activate all the virtual replicas of the public digital zone so that the user views the public digital zone fully in virtual reality.

In the current disclosure, the term "persistent" is used to characterize a state of a system that can continue to exist without a continuously executing process or network connection. For example, the term "persistent" may be used to characterize the virtual world system where the virtual world system and all of the virtual objects therein comprised continue to exist after the processes used for creating the virtual objects cease, and independent of users being connected to the virtual world system. Thus, the virtual world system is saved in non-volatile storage location in the server. In this way, the virtual objects may continue to exist even if users are not connected to the server.

Figure 2:
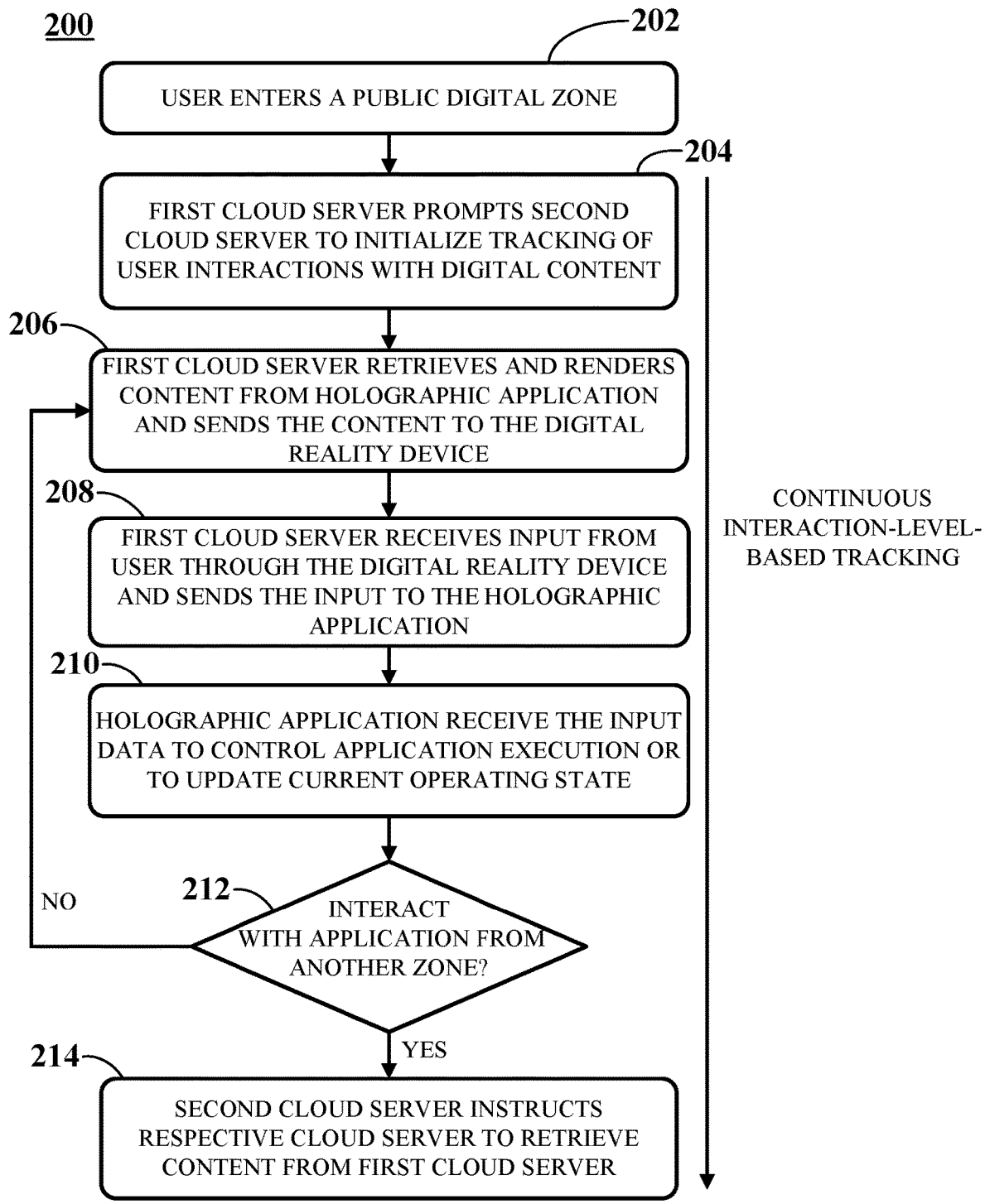
FIG. 2 depicts an interaction telemetry and tracking method, according to an embodiment.

FIG. 2 shows a block diagram of a method 200 enabling user interaction telemetry and tracking, according to an embodiment. Method 200 may be implemented by a system described herein, such as systems shown in FIGS. 1A-C, or by some other system.

In step 202, a digital reality device enters a public digital zone, wherein the first cloud server detects the digital reality device. Subsequently, the first cloud server signals a second cloud server to initialize telemetry and tracking of user interactions with digital content from the one or more holographic applications, as seen in step 204. In step 206, the first cloud server retrieves and renders digital content from the holographic application and sends the digital content to the user through a digital reality device. Afterwards, in step 208, the first cloud server receives input from the user through the digital reality device and sends the input to the one or more holographic applications in order to update the applications. In step 210, the one or more holographic applications receive the input data to control application execution or to update current application operating state.

As seen in step 212, during interactions between users and digital content, the users may have the option to switch to other holographic applications located in other public digital zones. If the user decides to keep interacting with the same holographic application or with other holographic applications within the same public digital zone, then the method 200 may go back to step 206 and continue the process. However, as seen in step 214, if users decide to interact with digital content from another holographic application located in another public digital zone, then the second cloud sever instructs the respective cloud server to retrieve content from first cloud server in order to provide the content to the user via the digital reality device.

Throughout all of the steps after the user has entered a public digital zone or switched to another public digital zone, the second cloud server tracks the most possible amount of interactions that take place between users and the digital content.

Figure 3:
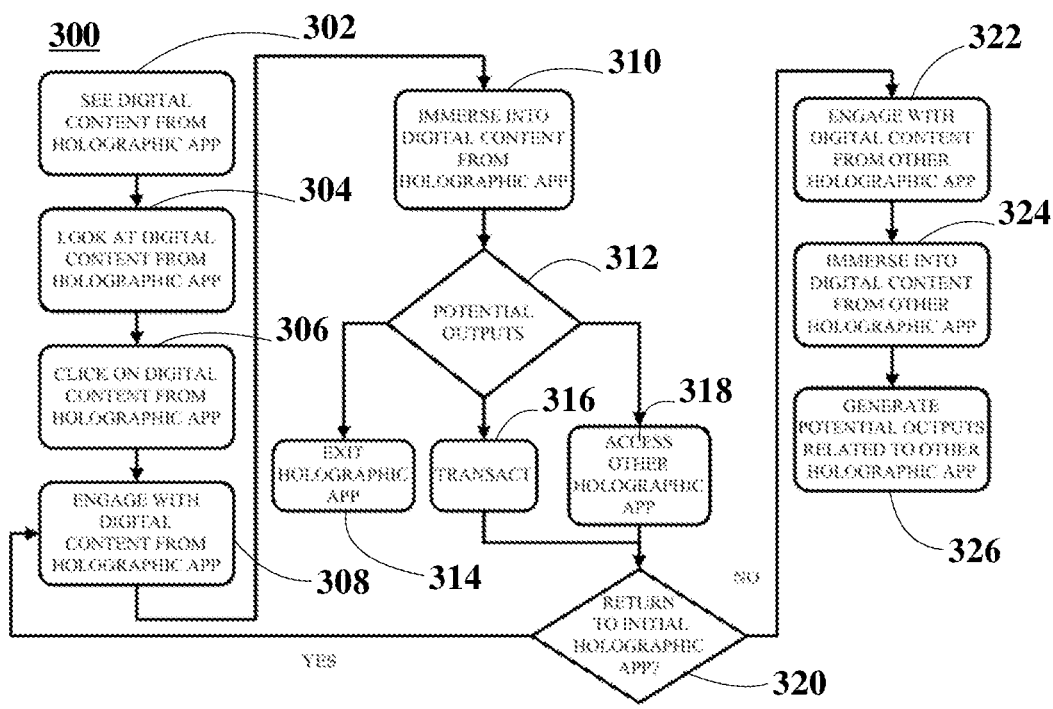
FIG. 3 depicts a continuous interaction telemetry and tracking method, according to an embodiment.

FIG. 3 depicts a method 300 enabling interaction telemetry and tracking. Method 300 may be implemented by a system described herein, such as systems shown in FIGS. 1A-C, or by some other system.

Method 300 may begin with one or more users seeing digital content from a holographic application, as viewed in step 302. The digital content from the holographic application may be sponsored or non-sponsored digital content. The term "seeing", as used in the current disclosure, refers to the act of directing one's eyes for a limited number of seconds (i.e., including a time component) or towards a limited number of interest points (i.e., including a space component) in the direction of the digital content from the holographic application. Subsequently, in step 304, the method may continue by a user looking at digital content from the holographic application. The term "looking", as used in the current disclosure, may also include a time component and/or a space component, and refers to the act of fixing one's eyes for a number of seconds greater than that of "seeing", or to a certain number of interest points greater than that of "seeing".

Afterwards, in step 306, the process may continue by one or more users clicking on digital content from the holographic application. The term "clicking on" may be used to include the act of clicking digital content with a mouse but may also include other forms of input (e.g., tapping) suited to other input devices (e.g., track pads and touch screens) that may be used for selecting particular digital content. Then, in step 308, the user may engage with the digital content from the holographic application. The term "engaging", as used in the current disclosure, refers to deeper levels of interaction including gestures, facial expressions, speech, body, hand or finger movements (e.g., horizontal or vertical movements at any angle, rotation around an axis, etc.), zooming in or out, stylus movements, air gestures, brain activity, and head and eye movements but excluding the simpler forms of interaction such as seeing, looking and clicking. Continuing in step 310, the one or more users may continue by getting immersed into digital content from the holographic application. The term "immersing", as used in the current disclosure, refers to the deepest level of interaction, and may include switching from the following views: public AR to private AR; public AR to private VR; public VR to private AR; and public VR to private VR Immersing includes any interactions that take place when the one or more users are in the private AR view or private VR view. In a private AR view or private VR view, the holographic application provides private sessions to users, making the digital content available only to the specific users in those private views.

Step 312 shows the different outputs that may result from one or more users getting immersed into digital content from the holographic application. These outputs include exiting the application, making a transaction, or accessing another holographic application, as seen in steps 314, 316, and 318, respectively. It is important to note that although step 314, exiting the application, is shown as a potential output from a user, getting immersed into digital content from the holographic application, a user may exit the holographic application at any other stage during the process. Transactions of step 316 include commercial or social transactions. The term "commercial transactions" herein refers to downloading, purchasing, selling, transferring, and exchanging one or more items. The term "social transactions" herein refers to rating, liking, or reviewing one or more items. Step 318, accessing other holographic applications, may refer to other holographic applications within the current public digital zone or located in another public digital zone.

After a user has made a transaction, or after the user has accessed another holographic application, the method provides the user with an option to return to the initial holographic application, as shown in step 320. If the user decides to return to the initial holographic application, the user may continue engaging with digital content from the initial holographic application, as shown in step 308. The process may thereafter continue until the user exits the holographic application, as shown in step 314. If the user does not desire to return to the initial holographic application, the user may continue by engaging with content from the other holographic application, immersing into digital content from the other holographic application, and generating potential outputs related to the other holographic application, as shown in steps 322, 324, and 326, respectively.

According to an embodiment, the method further comprises storing and analyzing, by the second cloud server, interaction data and metadata obtained and tracked from the digital reality devices. The interaction data and metadata of one or more users over time may form a history of interactions. In yet a further embodiment, interaction data and metadata are registered via the use of a smart contract. In such an embodiment, the smart contract serves as an interface between a user (such as a programmer or administrator of the smart contract) and storage or memory. In this way, the smart contract governs and provides an interface to the storage. In such an embodiment, the storage database is a form of blockchain or distributed ledger-based database. The use of smart contracts for registering interaction data and metadata through blockchains or distributed ledger-based databases may support the implementation of a trusted, transparent and immutable history of interactions that may serve as proof of business transactions. For example, data related to the history of interactions may be analyzed in order to automate the handling of business related commercial logic to support digital media buying models, market research, and business analysis through, for instance, analysis of accumulations of impressions, interaction-related pay-out (e.g., assessment of gaze time and associated pay-out), revenue splits, and the like.

Figure 4:
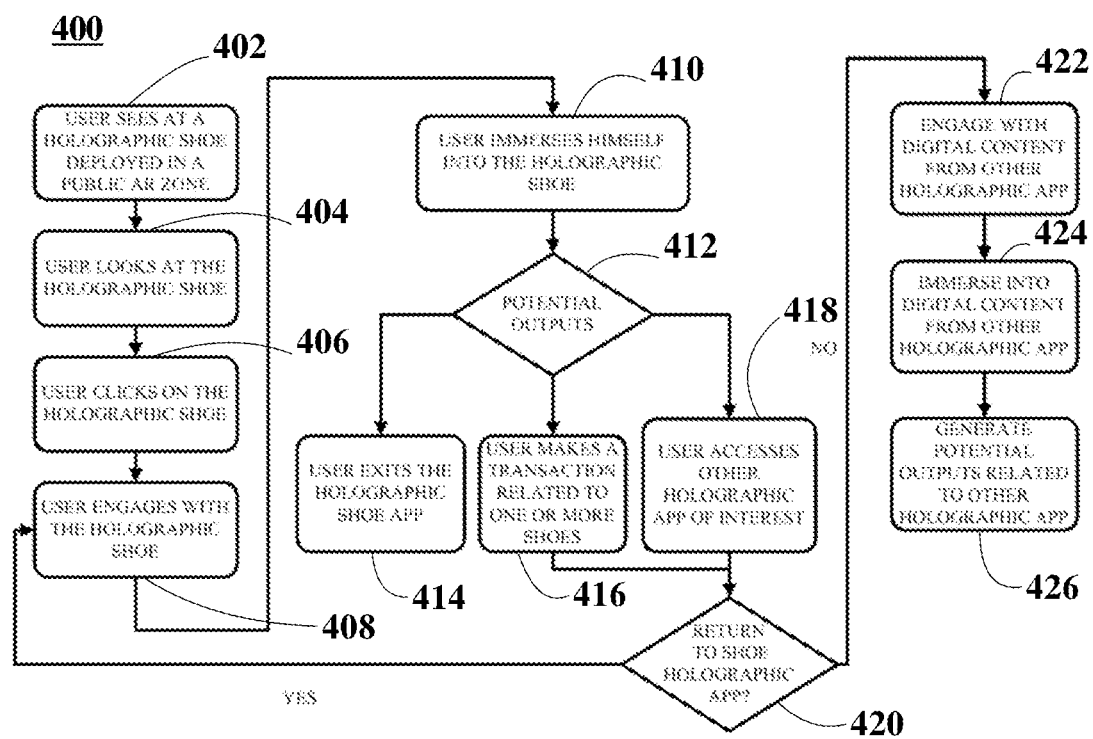
FIG. 4 depicts an example of the interaction telemetry and tracking method, according to an embodiment.

FIG. 4 depicts an example of the interaction telemetry and tracking method being employed for a shoe application interaction telemetry and tracking 400, whereby initial holographic application digital content being displayed to a user is in the form of a holographic shoe, according to an embodiment. In step 402, a user who has entered a public digital zone sees a holographic shoe that has been deployed by a holographic application located in that specific public digital zone. The holographic shoe displayed in the public digital zone may be a sponsored or a non-sponsored holographic shoe. The user, in step 404, then looks at the holographic shoe, thereafter clicking on the holographic shoe and starting to engage with the holographic shoe, as shown in steps 406 and 408, respectively. Examples of engagement with the holographic shoe may include sampling the shoe with hand movements, rotating the shoe, zooming in or out of the shoe to take a better view of the shoe's details, and the like.

The user may afterwards, in step 410, immerse himself into the digital content corresponding to the holographic shoe. In a private AR view, for example, the user may change the color, size, or design of the holographic shoe depending on the availability as provided by the holographic application and viewing the background of the real-world location where the user is at that moment. In a private VR view, the user may be virtually transported to a shoe store, where the user may view and engage with all of the shoes therein available and whereby some of the elements may be found in the real world. Resulting potential outputs of step 412, may include the user exiting the holographic application, the user making a transaction related to one or more shoes, or the user starting interaction with another item of interest that may or may not be related to the shoe, as seen in steps 414, 416, and 418, respectively. Transactions related to one or more shoes may include, for example, purchasing, liking, sharing, rating, or reviewing the one or more shoes, amongst others. The user may additionally, at any stage of the process, exit the holographic application.

After the user has completed a transaction related to one or more shoes, or after the user has accessed another holographic application of interest, the method provides the user with an option to return to the shoe holographic application, as seen in step 420. If the user decides to return to the shoe holographic application, the user may engage with the holographic shoe, as shown in step 408, and the process may thereafter continue until the user exits the holographic shoe application, as shown in step 408. If the user does not desire to return to the holographic shoe application, the user may continue to engage with digital content from the other holographic application, immerse himself into digital content from the other holographic application, and generate potential outputs related to other holographic applications, as seen in steps 422, 424, and 426, respectively.

All interaction data and metadata, including the transactions related to the one or more shoes, are tracked from the digital reality devices for supporting digital media buying models, market research, business analysis, and other purposes. For example, the shoe company may use the interaction time in each of the different levels of interaction (e.g., looking time or engagement time) to analyze through specific computer algorithms, e.g., through artificial intelligence algorithms, the user preferences with respect to shoes. For example, the company can sort which types of shoe the user may look at and/or interact with for a longer time, in order to provide related holographic applications in the form of advertisements specifically tailored for the user related to the preferred types of shoes. In other examples, the shoe company may compute, from the interaction data and metadata, the gaze time of the user to the shoe and an associated pay-out.

In yet a further embodiment, interaction data and metadata are registered via the use of a smart contracts governing and interfacing the path to the storage. In such an embodiment, the storage database is a form of blockchain or distributed ledger-based data base, supporting a trusted, transparent and immutable history of interactions that may serve as business transaction proof.

Although FIGS. 3 and 4 depict various levels of interaction occurring in a particular linear order to illustrate particular use cases, it will be understood that many other combinations of interactions are possible. For example, although FIGS. 3 and 4 depict seeing 302/402, followed by looking 304/404, clicking 306/406, engaging 308/408, and immersing 310/410, it will be understood that one or more of these steps may be omitted, repeated, or performed in a different order during interaction sessions. As an example, a user may omit clicking 306/406 on digital content as an intermediate step prior to engaging with 308/408 or immersing in 310/410 the digital content. As another example, a user may choose to engage with 308/408 the digital content without immersing in 310/410 the digital content. As another example, a user may return to looking at 304/404 the digital content after engaging with 308/408 the digital content, before proceeding to immerse in 310/410 the digital content.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. An interaction telemetry and tracking system, the system comprising:
  a first cloud server programmed to:
    detect a digital reality device accessing a public digital zone associated with one or more holographic applications stored in the first cloud server;
    signal a second cloud server to initiate tracking of interactions through the digital reality device with digital content of the one or more holographic applications;
    retrieve and render the digital content and send the digital content to the digital reality device; and
    receive user input via the digital reality device and send the user input to the one or more holographic applications in order to update the one or more holographic applications.

2. The system of claim 1, wherein the first cloud server is communicatively connected through a network to cloud servers of other public digital zones, and wherein the first cloud server is further programmed to, when the digital reality device moves to another public digital zone, prompt the second cloud server to continue tracking user interactions.

3. The system of claim 2, wherein the second cloud server is programmed to instruct corresponding cloud servers in the other public digital zones to retrieve the digital content from the one or more holographic applications in the public digital zone.

4. The system of claim 1, wherein the second cloud server is configured to store and perform analysis of interactions of the digital reality device based on the interaction data and telemetry metadata.

5. The system of claim 4, wherein analysis of the interactions is performed to support digital media buying models, market research, or business analysis, or combinations thereof.

6. The system of claim 5, wherein interaction data and metadata are registered via the use of a smart contract that governs and serves as an interface to storage in the form of a blockchain or a distributed ledger-based database.

7. The system of claim 1, wherein the public digital zone comprises an augmented reality zone or a virtual reality zone.

8. The system of claim 1, wherein the first cloud server is further programmed to enable the digital reality device to switch between public digital zones, including switching between augmented reality zones, switching between virtual reality zones, switching from augmented reality zones to virtual reality zones, or switching from virtual reality zones to augmented reality zones.

9. A method enabling interaction telemetry and tracking, the method comprising:
  detecting, by a first cloud server, that a digital reality device connected to a network is accessing a first public digital zone associated with a holographic application stored in the first cloud server;
  signaling, by the first cloud server, a second cloud server to initiate tracking of interactions through the digital reality device with digital content of the holographic application;
  retrieving and rendering, by the first cloud server, content from the holographic application and sending the digital content to the digital reality device; and
  receiving, by the first cloud server, user input via the digital reality device, and sending the input to the holographic application in order to update the holographic application.

10. The method of claim 9, further comprising:
  signaling, by the first cloud server to the second cloud server, to continue the tracking of the interactions in a second public digital zone when the digital reality device moves to the second public digital zone.

11. The method of claim 9, further comprising:
  instructing, by the second cloud server, corresponding cloud servers in other public digital zones to retrieve digital content from the holographic application in the first public digital zone stored in the first cloud server; and
  providing, by the corresponding cloud servers in the other public digital zones, the digital content to the digital reality device.

12. The method of claim 9, wherein the first cloud server enables the digital reality device to perform a plurality of levels of interaction and receive outputs to users from the first cloud server.

13. The method of claim 12, wherein the plurality of levels of interaction comprise:
  seeing digital content from the holographic application provided by the first cloud server in the first public digital zone;
  looking at the digital content from the holographic application;
  clicking on the digital content from the holographic application;
  engaging with the digital content from the holographic application; and
  immersing into the digital content from the holographic application.

14. The method of claim 12, wherein the outputs to users comprise exiting the holographic application, performing one or more commercial or social transactions, and accessing other holographic applications.

15. The method of claim 14, wherein in response to selection of performing one or more transactions or accessing other holographic applications, the method continues by performing the steps of:
  enabling returning to initial or other applications;

during user engagement with the initial or other applications, providing immersive experiences into digital content from the holographic application or other holographic applications; and generating outputs related to the holographic application or the other holographic applications.

16. The method of claim 14, wherein accessing other holographic applications comprises accessing holographic applications located within the first public digital zone or in other public digital zones.

17. The method of claim 9, wherein the first cloud server enables the digital reality device to switch between public digital zones by switching between augmented reality zones, switching between virtual reality zones, switching from augmented reality zones to virtual reality zones, and switching from virtual reality zones to augmented reality zones.

18. The method of claim 9, further comprising storing the interaction data and metadata obtained and tracked from the digital reality device; and analyzing the stored interaction data and metadata for supporting digital reality media buying models, market research, or business analysis, or combinations thereof.

19. One or more non-transitory computer readable-media having stored thereon instructions configured to cause a server computer system comprising memory and at least one processor to perform steps comprising:

detecting, by a first cloud server, that a digital reality device connected to a network is accessing a first public digital zone associated with a holographic application stored in the first cloud server;

signaling, by the first cloud server, a second cloud server to initiate tracking of user interactions through the digital reality device with digital content of the holographic application;

retrieving and rendering, by the first cloud server, content from the holographic application and sending the digital content to the digital reality device; and receiving, by the first cloud server, user input via the digital reality device, and sending the input to the holographic application in order to update the holographic application.

20. The one or more non-transitory computer readable-media of claim 19, wherein the instructions are further configured to cause the server computer system to signal, by the first cloud server to the second cloud server, to continue the tracking of the interactions in a second public digital zone when the digital reality device moves to the second public digital zone.

* * * * *